United States Patent
Doyle et al.

[11] Patent Number: 5,815,731
[45] Date of Patent: Sep. 29, 1998

[54] METHOD AND SYSTEM FOR PROVIDING DEVICE DRIVER CONFIGURATIONS ON DEMAND

[75] Inventors: Ronald Patrick Doyle, Raleigh; Patricia Stephany Hogan, Chapel Hill, both of N.C.; Sandra Juni Schlosser, Austin, Tex.

[73] Assignee: International Business Machines Corporation, Armonk, N.Y.

[21] Appl. No.: 742,232

[22] Filed: Oct. 31, 1996

[51] Int. Cl.$^6$ .................................................. G06F 9/00
[52] U.S. Cl. ........................... 395/830; 395/837; 395/284
[58] Field of Search ..................................... 395/821, 828, 395/830, 834, 837, 838, 839, 882, 281, 282, 283, 284, 651, 653

[56] References Cited

U.S. PATENT DOCUMENTS

| | | | |
|---|---|---|---|
| 5,530,895 | 6/1996 | Enstrom | 395/829 |
| 5,546,595 | 8/1996 | Norman et al. | 395/830 |
| 5,548,759 | 8/1996 | Lipe | 395/600 |
| 5,551,033 | 8/1996 | Foster et al. | 395/734 |
| 5,559,965 | 9/1996 | Oztaskin et al. | 395/830 |
| 5,566,346 | 10/1996 | Andert et al. | 395/828 |
| 5,579,529 | 11/1996 | Terrell et al. | 395/828 |
| 5,586,324 | 12/1996 | Sato et al. | 395/830 |
| 5,675,831 | 10/1997 | Caputo | 395/830 |
| 5,689,726 | 11/1997 | Lin | 395/830 |
| 5,689,730 | 11/1997 | Wakasugi | 395/830 |
| 5,717,950 | 2/1998 | Yamaguchi et al. | 395/830 |

*Primary Examiner*—Joseph Palys
*Attorney, Agent, or Firm*—Mark S. Walker; Anthony P. Ng; Andrew J. Dillon

[57] ABSTRACT

A method and system for providing device driver configurations on demand during runtime within a computer system is disclosed. In accordance with a method of the present invention, a Hardware Namespace is constructed by a Hardware Resource Manager and a Logical Device Namespace is constructed by a Logical Device Manager within the computer system. A determination is made as to whether or not the peripheral device is contained within the Hardware Namespace and whether or not a device driver for the peripheral device is also contained within the Logical Device Namespace, in response to a first attempt to access a peripheral device after system boot-up by an application software. In response to a determination that the peripheral device is not contained within the Hardware Namespace, a user is prompted to install the peripheral device within the computer system. On the other hand, in response to a determination that the device driver for the peripheral device is not contained within the Logical Device Namespace, the user is prompted to install the device driver for the peripheral device within the computer system. After loading the device driver to a system memory, the peripheral device can be utilized by the application software via the device driver.

6 Claims, 3 Drawing Sheets

METHOD AND SYSTEM FOR PROVIDING DEVICE DRIVER CONFIGURATIONS ON DEMAND

CROSS-REFERENCE TO A RELATED APPLICATION

The present invention is related to the subject matter of a co-pending United States patent application entitled "Configuration Manager for Providing Configuration Services to Device Drivers within a Computer System," Ser. No. 08/767,554, filed Dec. 16 1996, and assigned to the assignee herein named. The content of the above-mentioned co-pending patent application is incorporated by reference herein.

BACKGROUND OF THE INVENTION

1. Technical Field

The present invention relates to a method and system for data processing in general and, in particular, to a method and system for processing device drivers within a computer system. Still more particularly, the present invention relates to a method and system for providing device driver configurations on demand during runtime.

2. Description of the Prior Art

A typical computer system has an operating system that provides, inter alia, a basic set of device drivers between application programs and various peripheral devices such as a keyboard, fixed and floppy disk drives, display, printers, etc. These device drivers allow the application programs to utilize one or more of the peripheral devices by controlling or managing the flow of data between the application programs and peripheral devices.

When a new peripheral device is added to a computer system and such device is not operable under an existing device driver, a new device driver must be added to the system in order for the peripheral device to be utilized. Such new device driver is customarily supplied by the maker of the peripheral device and is installed in the computer system in accordance with a procedure established by the operating system. Though such installation procedure may seem to be relatively "easy," a novice computer user can sometimes be frustrated by the whole process, especially when the installation procedure must be repeated for almost any new peripheral device to be added to the computer system.

"Plug & Play" technology is a major industry-wide effort to alleviate the user's frustration caused by the installation of peripheral devices within IBM-compatible personal computers. In addition to making peripheral device installation and setup easier for computer users, Plug & Play technology also strives for compatibility with existing legacy peripheral devices. In essence, Plug & Play works by changing the manner in which peripheral devices are configured. Rather than placing the responsibility on the computer user, the operating system, hardware, and BIOS cooperate to provide an environment that assumes responsibility for the device driver configuration. Rather than requiring the computer user to set configuration settings on the peripheral device, the peripheral device is configurable on the command of the operating system.

The primary component for Plug & Play is a Configuration Manager within the operating system. The Configuration Manager is responsible for maintaining a database of information in a registry that describes the current configuration of the computer system and for notifying the device drivers of their assigned resources. To accomplish its task, the Configuration Manager relies on two other types of software, namely, enumerators and arbitrators. An enumerator is responsible for sequencing through each peripheral device and interrogating each one in turn about its characteristics. The enumerator then saves these characteristics in the registry. After the enumerator has cycled through all of the peripheral devices, arbitrators are subsequently called. An arbitrator is responsible for handling the assignment of resources and for resolving conflicts among various peripheral devices. When assigning resources, legacy peripheral devices with fixed resource requirements are always assigned first; then these resources are removed from an available pool. Next, tentative assignments are made for each remaining peripheral device within the computer system. When a conflict occurs, a Plug & Play compatible peripheral device may be asked to relinquish its previously assigned resources.

Under Plug & Play, nevertheless, the configuration of device drivers is still static in nature. All device drivers, each one corresponding to a peripheral device present within the computer system, will be loaded to a system memory during system boot-up time, regardless of whether or not the peripheral device will actually be utilized during runtime. Needless to say, valuable memory resources are wasted by idle device drivers under this arrangement. Consequently, it would be desirable to provide an improved method and system for providing device driver configurations such that device drivers are allocated dynamically on demand during runtime.

SUMMARY OF THE INVENTION

In view of the foregoing, it is therefore an object of the present invention to provide an improved method and system for data processing.

It is another object of the present invention to provide an improved method and system for processing device drivers within a computer system.

It is yet another object of the present invention to provide an improved method and system for providing device driver configurations on demand during runtime.

In accordance with a method of the present invention, a Hardware Namespace is constructed by a Hardware Resource Manager and a Logical Device Namespace is constructed by a Logical Device Manager within the computer system. A determination is made as to whether or not the peripheral device is contained within the Hardware Namespace and whether or not a device driver for the peripheral device is also contained within the Logical Device Namespace, in response to a first attempt to access a peripheral device after system boot-up by an application software. In response to a determination that the peripheral device is not contained within the Hardware Namespace, a user is prompted to install the peripheral device within the computer system. On the other hand, in response to a determination that the device driver for the peripheral device is not contained within the Logical Device Namespace, the user is prompted to install the device driver for the peripheral device within the computer system. After loading the device driver to a system memory, the peripheral device can be utilized by the application software via the device driver.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of personal computers under a number of different operating systems. In addition, the personal computer may be a stand-alone system or part of a network such as a local-area network (LAN) or a wide-area network (WAN). For the purpose of illustration, a preferred embodiment of the present invention, as described below, is implemented on a personal computer, such as the Aptiva™, having an operating system, such as OS/2™, both manufactured by International Business Machines Corporation.

Figure 1:
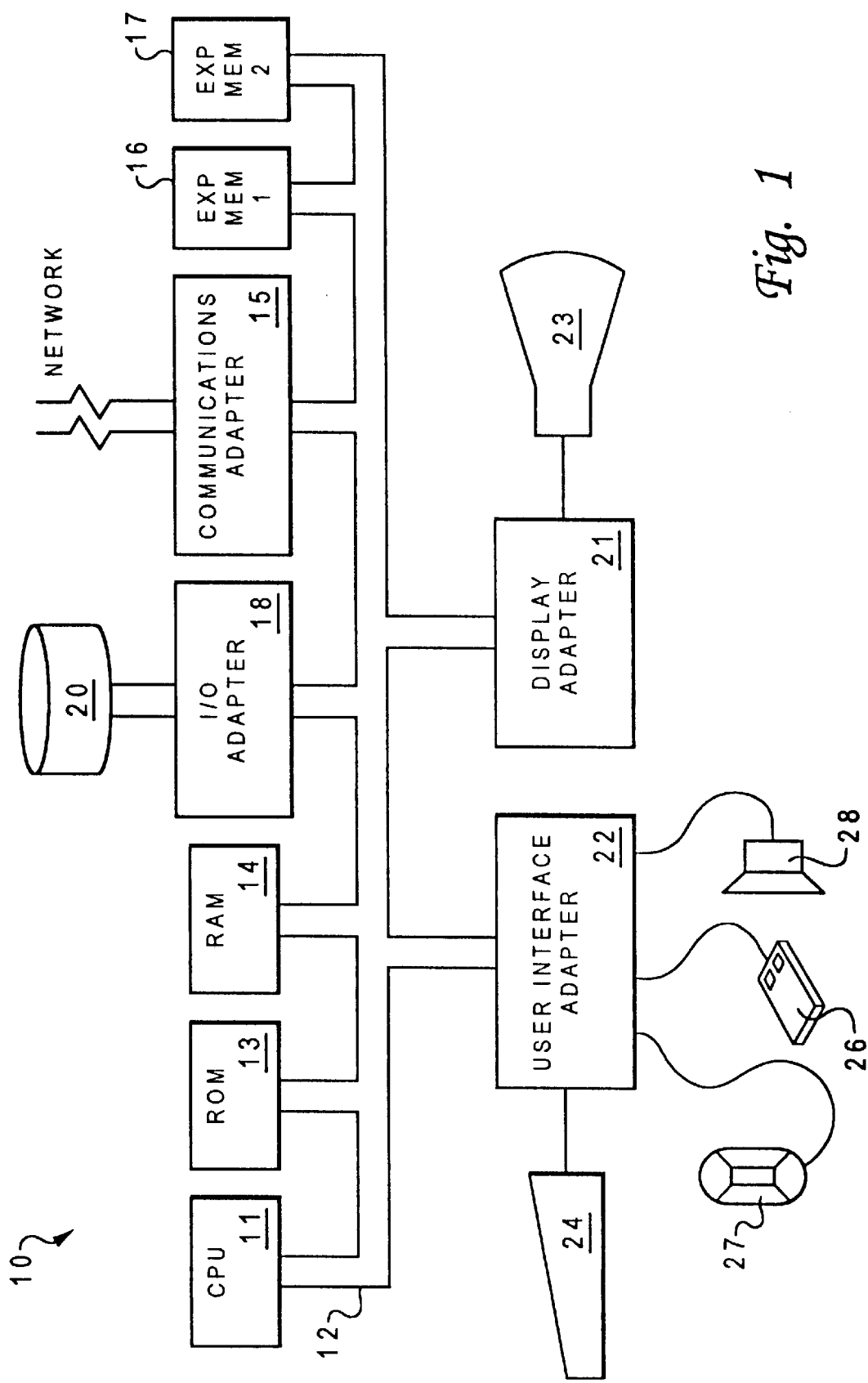
FIG. 1 is a block diagram of a computer system that may be utilized in conjunction with a preferred embodiment of the invention.

Referring now to the drawings and in particular to FIG. 1, there is depicted a diagram of a typical computer system 10 which may be utilized in conjunction with a preferred embodiment of the present invention. A central processing unit (CPU) 11, such as one of the Intel™ processors, is interconnected to various other components via system bus 12. Read only memory (ROM) 13, connecting to CPU 11 via system bus 12, includes a basic input/output system (BIOS) software that controls certain basic computer functions. Random access memory (RAM) 14, I/O adapter 18, and communications adapter 15 are also interconnected to system bus 12. Expanded memory 16 and expanded memory 17 may be added to computer system 10, and are shown to be interconnected to system bus 12.

Generally, expanded memories 16 and 17 are adapter cards that include multiple single in-line memory modules (SIMMs), along with corresponding registers capable of being written to by an appropriate device driver. I/O adapter 18 may be a Small Computer System Interface (SCSI) adapter that communicates with a disk storage device 20. Communications adapter 15 interconnects system bus 12 with an outside network, enabling computer system 10 to communicate with other such systems. In addition, input/output devices are connected to system bus 12 via user interface adapter 22 and display adapter 21. Keyboard 24, track ball 27, mouse 26, and speaker 28 are all interconnected to system bus 12 via user interface adapter 22. Display monitor 23 is connected to system bus 12 via display adapter 21. In this manner, a user is capable of inputting to computer system 10 through keyboard 24, track ball 27, or mouse 26 while receiving output from computer system 10 via speaker 28 and display monitor 23.

Figure 2:
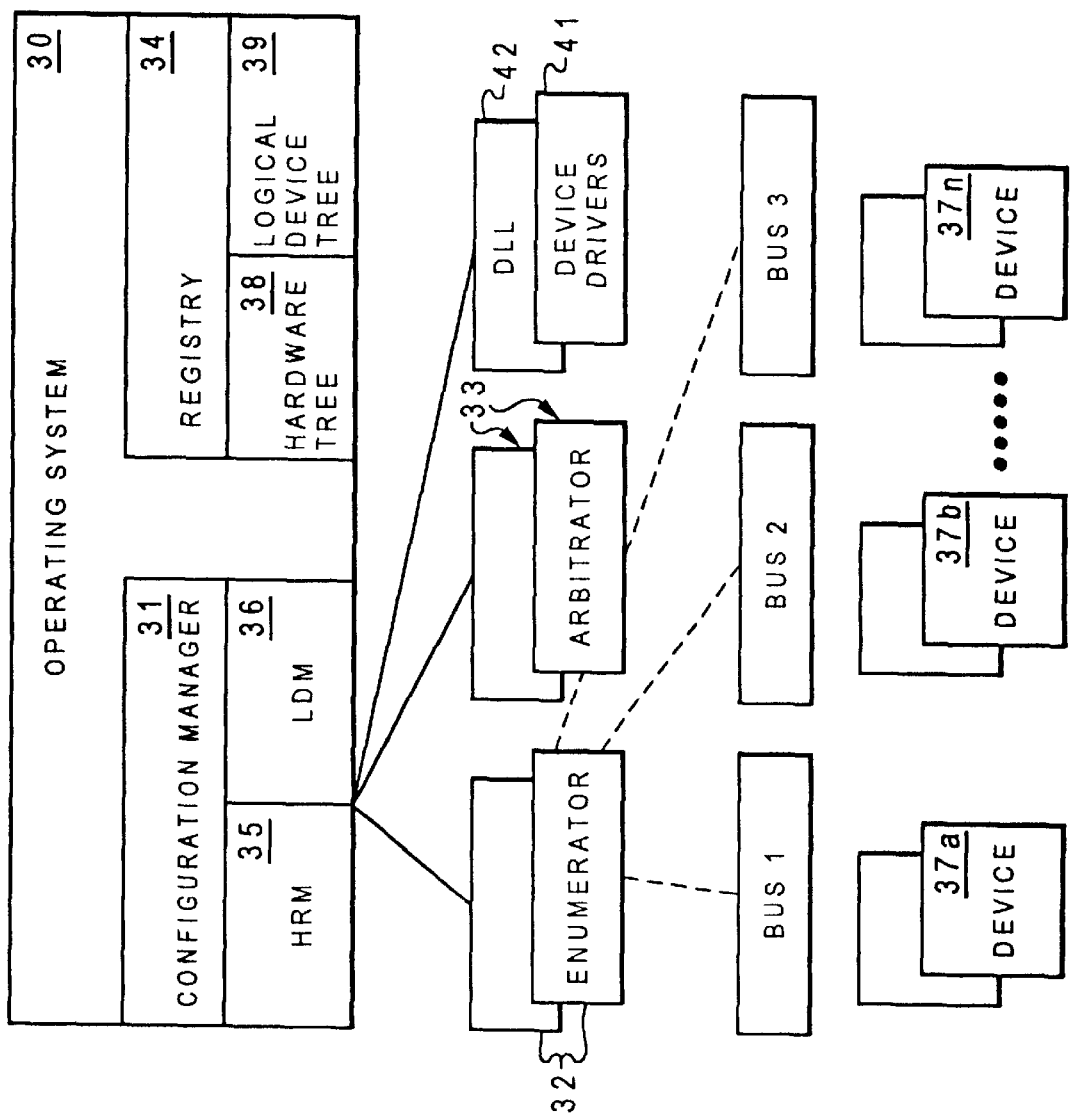
FIG. 2 is a relational block diagram of a software hierarchy for an operating system to be utilized within a computer system, according to a preferred embodiment of the invention.

With reference now to FIG. 2, there is depicted a relational block diagram of a software hierarchy for an operating system to be utilized within computer system 10, according to a preferred embodiment of the invention. As shown, operating system 30 includes software modules such as a Configuration Manager 31, enumerators 32, arbitrators 33, a registry 34, a hardware resource manager (HRM) 35, and a logical device manager (LDM) 36. These software modules are preferably coded in an object-oriented programming language such as C++; however, it is understood by those skilled in the art that any conventional software development techniques can be utilized to develop software code for these software modules as their functions are described as follows.

Enumerators 32 are executable software routines called upon periodically by operating system 30 to determine what peripheral devices 37a–37n may be connected to computer system 10. By periodically polling the locations on a specified bus where peripheral devices are connected to computer system 10, enumerators 32 determine the presence of a new peripheral device. Peripheral devices 37a–37n contain a device identification string in a predetermined memory location (not shown) that enumerator 32 accesses for acquiring the necessary information.

Once a peripheral device 37a–37n is found and identified, the device identification string for the peripheral device is reported by an enumerator 32 and stored in a Hardware Tree (or Hardware Namespace) 38 maintained by HRM 35. All peripheral devices 37a–37n connecting to computer system 10 are listed in this Hardware Tree 38 that is collectively built by various enumerators 32. Hardware Tree 38 is a software module that accepts and stores the names of all the enumerated peripheral devices. Typically, Hardware Tree 38 is a hierarchical database stored in a system memory, such as RAM 14, within the computer system. In addition, Hardware Tree 38 is also loaded with information concerning system resources, obtained from registry 34, which can be utilized for enumerating peripheral devices 37a–37n. Thus, the information stored in Hardware Tree 38 includes the names of the executable files, such as device drivers that are listed in registry 34, and are available for operating peripheral devices 37a–37n.

Registry 34 is preferably contained within operating system 30. Registry 34 includes information about the executable files, such as the device drivers mentioned previously, and information about all peripheral devices 37a–37n that are connected to computer system 10, including device identification strings, configuration information, and requirements of different peripheral devices 37a–37n for which device drivers 41 and/or dynamic linked libraries (DLL) 42 are needed. Registry 34 is loaded with the device identification strings for peripheral devices 37a–37n that are installed within computer system 10 by Configuration Manager 31. Thus, registry 34 contains an up-to-date list of all peripheral devices 37a–37n that are operably connected to computer system 10 at any time.

Configuration Manager 31 utilizes arbitrator 33 to manage enumerated peripheral devices 37a–37n. Configuration Manager 31 assigns an appropriate one of device drivers 41 and/or library file 42 to each of enumerated peripheral devices 37a–37n contained within Hardware Tree 38, as needed. Arbitrators 33 are preferably pre-programmed in operating system 30 to understand the constraints of computer system 10, including standard I/O, memory, hardware interrupts, and DMA channel resources that are available within computer system 10. Configuration Manager 31 reviews Hardware Tree 37 and assigns enumerated peripheral devices 37a–37n to the available resources in computer system 10 based on this information.

Since the 80386 processors, a processor from Intel™ has four privilege levels, 0–3. Level 0 is the most privileged and Level 3 is the least privileged. These four levels can be visualized as four concentric circles, or rings. Ring 0 components form the foundation of an operating system; thus Configuration Manager 31 is one of the Ring 0 components.

Figure 3:
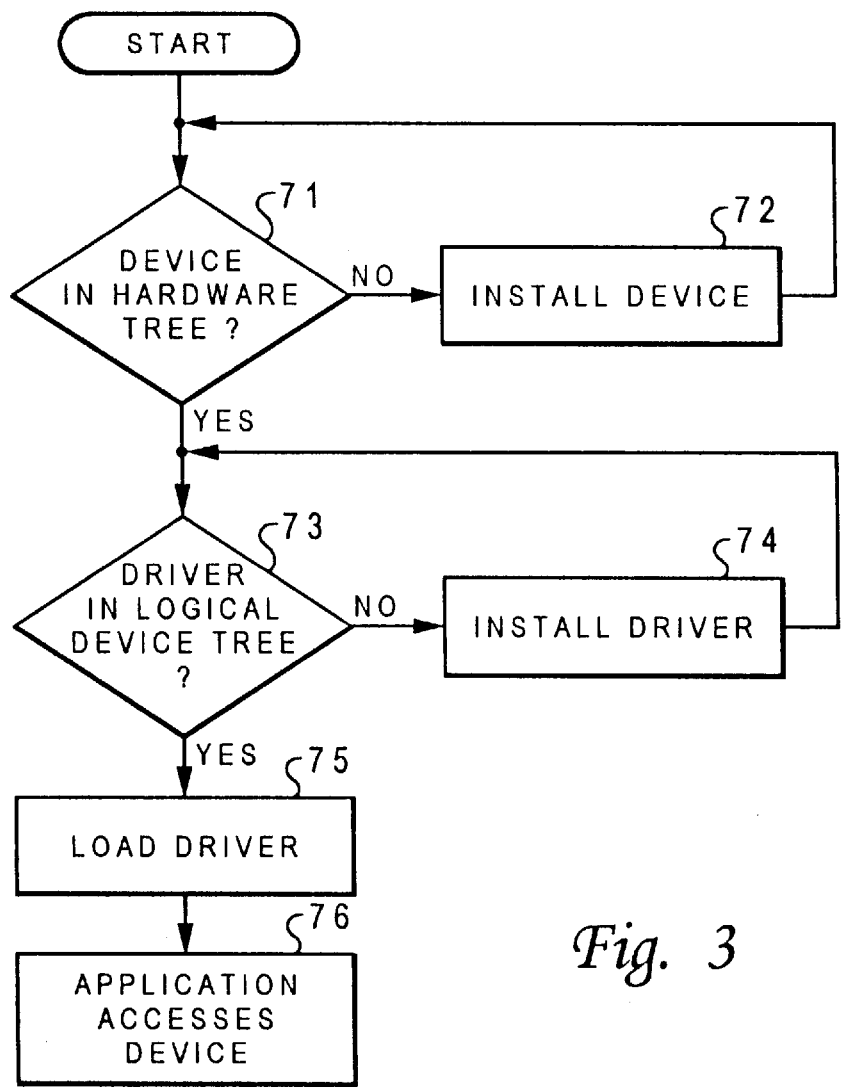
FIG. 3 is a high-level logic flow diagram of a method for providing device driver configurations on demand during runtime within a computer system, in accordance with a preferred embodiment of the invention.

Referring now to FIG. 3, there is illustrated a high-level logic flow diagram of a method for providing device driver configurations on demand during runtime within a computer system, in accordance with a preferred embodiment of the invention. Only when an application software within the computer system is attempting to access a peripheral device for the first time after system boot-up, a determination is made by the application software as to whether or not the peripheral device actually exists within the Hardware Tree, as shown in block 71. If the peripheral device does not exist in the Hardware Tree, the HRM may prompt a user to install or plug in the peripheral device, as depicted in block 72, and the process returns back to block 71. After the installation of a peripheral device to the computer system, a system reboot may sometimes be required in order for the computer system to recognize the newly added peripheral device. For a computer system having a hot-pluggable bus, however, the parent bus will receive a notice as soon as a new peripheral device is being added to the computer system. In turn, the parent bus will notify the Configuration Manager about the presence of the newly added peripheral device, which deems the step of system reboot unnecessary.

Otherwise, if the peripheral device is found in the Hardware Tree, a determination is further made as to whether or not the required device driver for the peripheral device is stored within the Logical Device Tree, as shown in block 73. If the required driver is not stored within the Logical Device Tree, the LDM may prompt the user to install the required device driver, as depicted in block 74, and the process then returns back to block 73. If the required driver for the peripheral device is found within the Logical Device Tree, an Open command is performed to the device driver information stored within the Logical Device Tree in order to cause the device driver to be loaded into a system memory by the LDM, as illustrated in block 75. At this point, the peripheral device is ready to be accessed by the application software as illustrated in block 76.

Note that when an application software does not access a peripheral device for a long time (i.e., the peripheral device is idle), the Configuration Manager may unload the device driver sua sponte. Hence, next time, when the application software needs to access the peripheral device again, the application software will be notified that the device driver is unloaded. In such a case, the requested device driver will need to be reloaded again.

In other instances, one or more device drivers for the same peripheral device may be found in the Logical Device Tree. Thus, one or more drivers may be opened for the same peripheral device by one or more applications. A separation of the Hardware Tree and the Logical Device Tree within the Configuration Manager in accordance with a preferred embodiment of the present invention makes this possible.

As has been described, the present invention provides an improved method for providing device driver configurations on demand during runtime.

While the invention has been particularly shown and described with reference to a preferred embodiment, it will be understood by those skilled in the art that various changes in form and detail may be made therein without departing from the spirit and scope of the invention.

What is claimed is:

1. A method for providing device driver configurations on demand during runtime within a computer system, said method comprising the steps of:

constructing a Hardware Namespace by a Hardware Resource Manager within said computer system;

constructing a Logical Device Namespace by a Logical Device Manager within said computer system;

only in response to an attempt to access a peripheral device for the first time by an application software after system boot-up, determining whether or not said peripheral device is contained within said Hardware Namespace utilizing said Hardware Resource Manager, and determining whether or not a device driver for said peripheral device is also contained within said Logical Device Namespace utilizing said Logical Device Manager;

in response to a determination that said peripheral device is not contained within said Hardware Namespace, prompting a user to install said peripheral device within said computer system;

in response to a determination that said device driver for said peripheral device is not contained within said Logical Device Namespace, prompting said user to install said device driver for said peripheral device to said computer system; and loading said device driver to a system memory such that said peripheral device can be utilized by said application software via said device driver.

2. The method for providing device driver configurations on demand during runtime according to claim 1, wherein said step of prompting a user to install a peripheral device is performed by said Hardware Resource Manager.

3. The method for providing device driver configurations on demand during runtime claim 1, wherein said step of prompting a user to install a device driver is performed by said Logical Device Manager.

4. The method for providing device driver configurations on demand during runtime claim 1, wherein said step of loading a device driver is performed by said Logical Device Manager.

5. A computer system having device driver configurations provided on demand during runtime, said computer system comprising:

a Hardware Resource Manager for constructing a Hardware Namespace within said computer system;

a Logical Device Manager for constructing a Logical Device Namespace said computer system;

wherein said Hardware Resource Manager determines whether or not a peripheral device is contained within said Hardware Namespace, and said Logical Device Manager determines whether or not a device driver for said peripheral device is also contained within said Logical Device Namespace, only in response to an attempt to access said peripheral device for the first time by an application software after system boot-up;

means for prompting a user to install said peripheral device within said computer system, in a determination that said peripheral device is not contained within said Hardware Namespace;

means for prompting said user to install said device driver for said peripheral device to said computer system, in a determination that said device driver for said peripheral device is not contained within said Logical Device Namespace; and means for loading said device driver to a system memory such that said peripheral device can be utilized by said application software via said device driver.

6. A computer program product residing on a computer-usable medium for providing device driver configurations on demand during runtime within a computer system, said computer product comprising:

a Hardware Resource Manager program code means for constructing a Hardware Namespace within said computer system;

a Logical Device Manager program code means for constructing a Logical Device Namespace said computer system;

wherein said Hardware Resource Manager program code means determines whether or not a peripheral device is contained within said Hardware Namespace, and said Logical Device Manager program code means determines whether or not a device driver for said peripheral device is also contained within said Logical Device Namespace, only in response to an attempt to access said peripheral device for the first time by an application software after system boot-up;

program code means for prompting a user to install said peripheral device within said computer system, in a determination that said peripheral device is not contained within said Hardware Namespace;

program code means for prompting said user to install said device driver for said peripheral device to said computer system, in a determination that said device driver for said peripheral device is not contained within said Logical Device Namespace; and program code means for loading said device driver to a system memory such that said peripheral device can be utilized by said application software via said device driver.

\* \* \* \* \*

UNITED STATES PATENT AND TRADEMARK OFFICE
CERTIFICATE OF CORRECTION

PATENT NO. : 5,815,731
DATED : September 29, 1998
INVENTOR(S) : Doyle et al.

It is certified that error appears in the above-identified patent and that said Letters Patent is hereby corrected as shown below:

On the title page item [56],
Under Attorney, Agent or Firm: Please change "Anthony" to -- Antony --.

Signed and Sealed this

Second Day of March, 1999

Attest:

Attesting Officer

Q. TODD DICKINSON

Acting Commissioner of Patents and Trademarks